United States Patent [19]

Own

[11] Patent Number: 4,780,573
[45] Date of Patent: Oct. 25, 1988

[54] SWITCH/SOCKET COVER

[76] Inventor: Joseph K. M. Own, No. 8 Lane 737, Tun Hwa S. Rd., Taipei, Taiwan

[21] Appl. No.: 878,018

[22] Filed: Jun. 24, 1986

[51] Int. Cl.$^4$ .............................................. H05K 5/03
[52] U.S. Cl. ..................................................... 174/66
[58] Field of Search ........................... 174/66; 220/241

[56] References Cited

U.S. PATENT DOCUMENTS

| | | | |
|---|---|---|---|
| 2,289,198 | 7/1942 | Jordan | 220/241 |
| 2,515,820 | 7/1950 | Clark | 174/66 X |
| 2,980,283 | 4/1961 | Bentsen | 220/241 |
| 3,437,738 | 4/1969 | Wagner | 174/66 X |

Primary Examiner—Fred L. Braun
Assistant Examiner—David A. Tone
Attorney, Agent, or Firm—Bucknam and Archer

[57] ABSTRACT

Disclosed herein an improved switch/socket cover which has a simple structure. It comprises a face plate, a replaceable picture and a fixing block, and it is characterized by the design of the fixing block which is hollow and has two slots in appropriate positions at two sides to be fixed to a base for switch/socket for installation of switch and socket and the picture which has a rectangular opening in the middle corresponding to the socket surface and a rectangular opening in the middle of the face plate which has an oblique edge at one side and two tenons with triangular cross section in appropriate position at the opposite side for inserting into the slots in order to fix the picture on the fixing block.

1 Claim, 2 Drawing Sheets

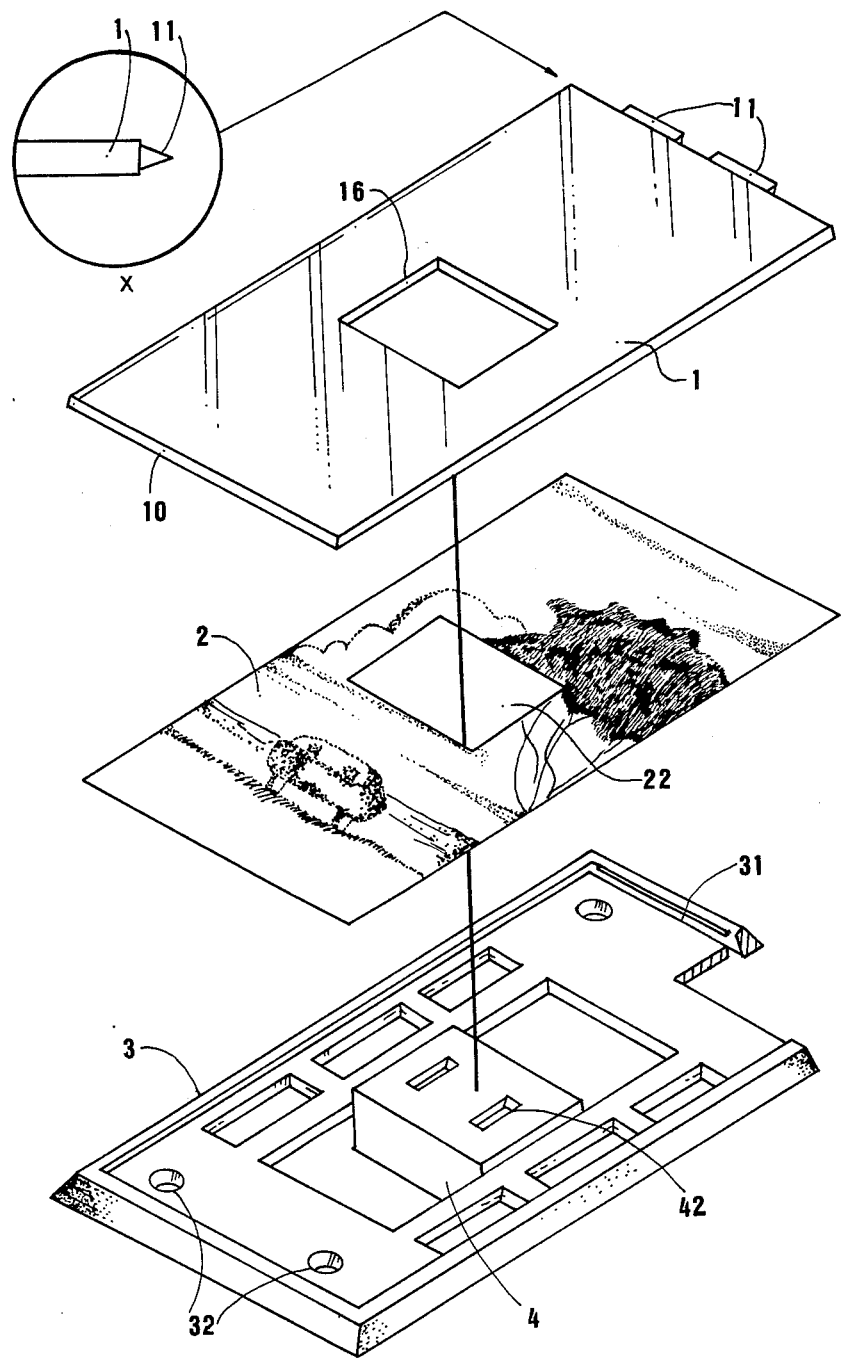
FIG:2

SWITCH/SOCKET COVER

SUMMARY OF THE INVENTION

The present invention relates to an improved switch/socket cover, which comprises a transparent face plate, a picture and a fixing block. The fixing block has a structure similar to the structure being used for home electric appliances, and is a hollow block for installation of switch/socket. The fixing block has two slots in appropriate position at two sides. It is mainly characterized by the design of the transparent face plate which has an oblique edge and two tenons for easy inserting into the slots of the fixing block in order to fix a replaceable picture on the fixing block. It has a simple structure and is easy to assemble and disassemble.

BACKGROUND OF THE INVENTION

The present invention relates to a new design of improved switch/socket cover.

Progress of living has increased the number of electrical home appliances.

Electric appliance manufacturers put new products in the market continuously to meet the public demand. At the time while electric appliances are indispensable, there are many switches and sockets in a home for different electric appliances.

The traditional switch/socket is fixed by means of screws or a hook on its back. Both of them require accuracy of the face plate and require considerable complicated installation processes. Therefore, It is not a practical design. Furthermore, the face plate on switch/socket available in the market now is of flat and dull design and gives no aid to decoration.

In view of the above defects, and with an understanding that socket and switch are indispensable in the modern living environment where electric appliances are popular, the inventor created an improved switch/socket cover after a series of studies, tests and improvements to provide a means to decorate indoor space with replaceable picture which is easy to assemble and disassemble.

Detailed description of the structure and characteristics of the present invention is given below with reference to the attached drawings.

BRIEF DESCRIPTION OF DRAWINGS

FIG. 2 is a fragmental and perspective view of the improved switch/socket cover according to the present invention.

DETAILED DESCRIPTION

Figure 1:
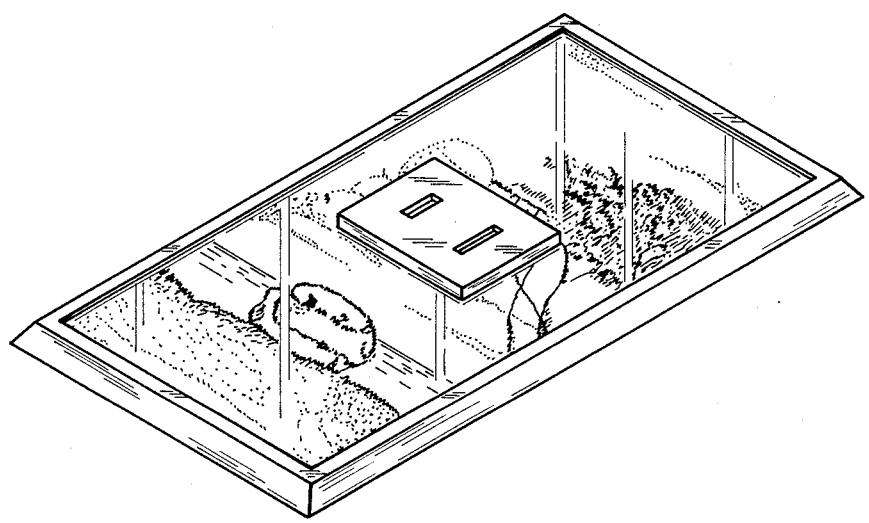
FIG. 1 is a view of the improved switch/socket cover according to the present invention.

As shown in FIG. 2, the present invention involves a specially designed transparent face plate (1) which has an oblique edge (10) at one side and two oblique tenons (11) at appropriate positions along the opposite side. Each of tenons (11) has a triangular cross section as shown in a magnified view X. There is a rectangular opening (12) with oblique edge (16) in the middle of the face plate (1). The oblique edge (10) has two tenons (12) of the face plate (1) are for fixing to two slots (31) and two sides of a fixing block (3) which is a hollow plastic block made by injection process. The fixing block (3) is for installation of socket (4) or switch (not shown in the drawings). The opening (12) of the face plate (1) is slightly larger than the socket surface (42) of the socket (4). Two screw holes at symmetrical positions on two lateral sides of the fixing block (3) are designed to fix the fixing block to wall by means of screws. They are not described in detail because they are commonly used. With reference to FIGS. 1 and 2, a picture (2) is placed on the fixing block (3) after fixing the fixing block (3) on a base for socket/switch on a wall. The picture (2) has also a rectangular opening (22) corresponding to the socket surface (42). Then, the oblique surface (10) of the face plate (1) is inserted into a slot (31) of the fixing block (3) and the tenons (11) are inserted into another slot (31) to complete the assembly. For insertion of the oblique side and tenons, a light pushing toward the edge of the slots will facilitate the insertion. For replacement of picture to fit indoor decoration, remove the face plate (1) by disengaging the tenons (11) from the slot (31) of the fixing block.

In conclusion, the present invention, an improved switch/socket cover, is simple in structure and it is easy to assemble and disassemble. The picture in it is replaceable. It has never been disclosed in any local/overseas publication or used openly. It is a novel and practical design which is patentable. A patent application is thus filed in accordance with laws.

I claim:

1. A switch or socket cover comprising a transparent faceplate[1], a fixing block[3], and a picture[2], said faceplate having a beveled edge[10] on one side, two tenons of triangular cross section on the opposite side, and an opening[12] with beveled edges, said fixing block being hollow and having first and second slots[31] for engagement with said tenons and a third slot for engagement with said beveled edge of said faceplate, said picture being placed on the block when the cover is assembled, said picture having an opening for a switch or socket, said beveled edge of the faceplate being inserted into said third slot of said fixing block, said tenons being inserted into the first and second slots when the cover is assembled.

* * * * *